United States Patent [19]

Drent

[11] Patent Number: 4,804,738

[45] Date of Patent: Feb. 14, 1989

[54] CATALYTIC PREPARATION OF CARBON MONOXIDE/ETHYLENE/SECONDARY ETHYLENICALLY UNSATURATED HYDROCARBON TERPOLYMER

[75] Inventor: Eit Drent, Amsterdam, Netherlands

[73] Assignee: Shell Oil Company, Houston, Tex.

[21] Appl. No.: 106,822

[22] Filed: Oct. 13, 1987

[30] Foreign Application Priority Data

Oct. 16, 1986 [NL] Netherlands .................... 8602595

[51] Int. Cl.[4] ............................................. C08G 67/02
[52] U.S. Cl. .................................................. 528/392
[58] Field of Search ........................................ 528/392

[56] References Cited

U.S. PATENT DOCUMENTS

| | | | |
|---|---|---|---|
| 2,495,286 | 1/1950 | Brubaker | 260/63 |
| 3,689,460 | 9/1972 | Nozaki | 260/63 |
| 3,984,388 | 10/1976 | Shryne et al. | 260/63 |

FOREIGN PATENT DOCUMENTS

| | | |
|---|---|---|
| 0121965 | 10/1984 | European Pat. Off. . |
| 0181014 | 5/1986 | European Pat. Off. . |
| 213671 | 3/1987 | European Pat. Off. . |
| 0229408 | 7/1987 | European Pat. Off. . |
| 1081304 | 3/1965 | United Kingdom . |

*Primary Examiner*—Harold D. Anderson

[57] ABSTRACT

An improved process for the production of terpolymers of carbon monoxide, ethylene and a secondary ethylenically unsaturated hydrocarbon comprises contacting the monomers in the presence of a catalyst formed from a palladium compound, an anion of a non-hydrohalogenic acid having a pKa less than about 4 and certain cyclic bidentate ligands containing nitrogen.

8 Claims, No Drawings

CATALYTIC PREPARATION OF CARBON MONOXIDE/ETHYLENE/SECONDARY ETHYLENICALLY UNSATURATED HYDROCARBON TERPOLYMER

This invention relates to an improved process for the production of certain terpolymers of carbon monoxide and ethylenically unsaturated hydrocarbons. More particularly, the invention relates to an improved process for the production of terpolymers of carbon monoxide, ethylene and a secondary ethylenically unsaturated hydrocarbon.

BACKGROUND OF THE INVENTION

Polymers containing units of carbon monoxide and one or more ethylenically unsaturated hydrocarbons are known in the art. Brubaker, U.S. Pat. No. 2,495,286, prepared such materials in the presence of certain free radical catalysts, e.g., organic peroxy compounds. British Pat. No. 1,081,304 produced such materials in the presence of alkylphosphine complexes of palladium. Nozaki extended the scope of the polymerization reaction to include various arylphosphine complexes of palladium, U.S. Pat. No. 3,689,460, and cyanide complexes of palladium, e.g., U.S. Pat. No. 3,835,123. Shryne et al described similar polymerizations in certain solvents such as hexafluoroisopropanol and m-cresol, U.S. Pat. No. 3,984,388. Published European Patent Application No. 0,121,965, published Oct. 17, 1984, describes the polymerization of carbon monoxide and unsaturated hydrocarbons in the presence of a compound of palladium, cobalt or nickel, an anion of a non-halogenic acid having a pKa less than 2 and a bidentate ligand of phosphorus, arsenic or antimony. Copending U.S. patent application Ser. No. 935,431, filed Nov. 26, 1986, discloses the polymerization of carbon monoxide and certain primary olefins in the presence of bidentate ligands of nitrogen.

When the polymer product is a linear alternating polymer of carbon monoxide and unsaturated hydrocarbon, the polymer is referred to as a polyketone. Such materials are premium thermoplastics having a variety of known uses. One disadvantage of some polyketones, e.g., copolymers of carbon monoxide and ethylene, in some applications is a relatively high melting point. This disadvantage can be overcome through addition of a plasticizer to the polyketone, if a suitable plasticizer is available, but also through the incorporation in the polymer chain of a second hydrocarbon monomer. The resulting terpolymers will generally have melting points below analogous copolymers.

Production of terpolymers of carbon monoxide, ethylene and a primary ethylenically unsaturated hydrocarbon, e.g., an ethylenically unsaturated hydrocarbon having only one hydrocarbyl substituent on a carbon atom of the ethylenic unsaturation such as propylene or octene-1, is accomplished with relative ease, Published European Patent Application No. 0,121,965. More difficult is encountered if terpolymers are desired which are formed from carbon monoxide, ethylene and a secondary olefinically unsaturated hydrocarbon. A secondary ethylenically unsaturated hydrocarbon is one in which two hydrocarbyl substituents are attached to a carbon atom of the ethylenic unsaturation, e.g., isobutylene. It would be of advantage to provide an improved process for the production of terpolymers of carbon monoxide, ethylene and secondary olefinically unsaturated hydrocarbon.

SUMMARY OF THE INVENTION

It has now been found that an improved process for the production of terpolymers of carbon monoxide, ethylene and secondary ethylenically unsaturated hydrocarbons comprises contacting the monomers, under polymerization conditions, in the presence of a catalyst formed from a palladium compound, an anion of a non-hydrohalogenic acid having a pKa less than about 4 and certain cyclic bidentate ligands of nitrogen. The process produces terpolymers having significant proportions of all monomers and which are characterized by melting points below that of the carbon monoxide/ethylene copolymer.

DESCRIPTION OF THE INVENTION

The palladium compound employed in the catalyst of the invention is a palladium salt of an organic acid, preferably a salt of a carboxylic acid of up to 10 carbon atoms and up to 2 carboxyl groups. Although palladium alkanoates such as palladium propionate or palladium octoate are especially suitable, in part because of reasons of availability palladium acetate is preferred.

The anion employed in the catalyst composition of the invention is the anion of a non-hydrohalogenic acid having a pKa less than about 4, preferably less than about 2. Preferred anions are anions of oxygen-containing acids including anions of inorganic acids such as perchloric acid, sulfuric acid, phosphoric acid and nitrous acid or anions of organic acids including anions of carboxylic acids such as trichloroacetic acid, trifluoroacetic acid, difluoroacetic acid, tartaric acid and 2,5-dihydroxybenzoic acid as well as anions of sulfonic acids such as para-toluenesulfonic acid, 2-hydroxypropane-2-sulfonic acid, methanesulfonic acid and trifluoromethanesulfonic acid. Anions of trifluoroacetic acid and p-toluenesulfonic acid constitute a preferred class of anions for the catalyst composition of the invention.

The anion is provided in the form of the acid or alternatively is provided in the form of a salt. When provided as a salt, metal salts wherein the metal is a transition metal of Groups IB through Group VIIB of the Periodic Table of Elements are suitable. When a transition metal salt is employed as the source of the anion, a copper salt has been found to be of particular use. In yet another modification, the palladium compound and the anion are provided as a single compound, e.g., palladium p-tosylate (p-toluenesulfonate).

The anion is provided in a quantity of from about 0.5 equivalent to about 200 equivalents per gram atom of palladium (as the compound), preferably from about 1 equivalent to about 100 equivalents per gram atom of palladium.

The bidentate nitrogen ligand of the catalyst composition of the invention is a ligand of the formula

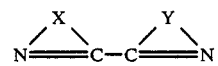

wherein X and Y independently are bridging groups of from 2 to 10 carbon atoms inclusive and up to 2 nitrogen atoms, with from 3 to 4 atoms in the bridge, at least 2 of which are carbon atoms and any other atoms in the bridge being nitrogen atoms. Illustrative of such bidentate ligands are the 2,2'-bipyridines, the 1,10-phenanthrolines, the 2,2'-biquinilones, the 2-(2-pyridyl)benzimidazolines and the 3-(2-pyridyl)-5,6-diphenyl-1,2,4-triazines. In general, the preferred bidentate nitrogen ligands are those in which X and Y are the same such as the bipyridines and the phenanthrolines.

Illustrative 2,2'bipyridines are those wherein the ring carbon atoms are unsubstituted (other than by hydrogen) or are substituted with alkyl groups, e.g., lower alkyl of 1 to 4 carbon atoms inclusive such as methyl, ethyl and butyl, with halo groups, particularly chloro, alkoxy wherein the alkyl moiety is lower alkyl or carboxy. Such bipyridines include 2,2'-bipyridine, 4,4'-dichloro-2,2'-bipyridine, 4,4'-dimethoxy-2,2'-bipyridine, 3,3'-dimethyl-2,2'-bipyridine and 4,4'-dicarboxy-2,2'-bipyridine. The preferred bidentate ligand of this class is 2,2'-bipyridine.

Also constituting a preferred class of bidentate nitrogen ligands are the 1,10-phenanthrolines which are unsubstituted (except with hydrogen) or are substituted with lower alkyl, halo especially chloro or sulfonic acid groups. Such phenanthrolines include 1,10-phenanthroline, 5-chloro-1,10-phenanthroline, 4,7-dimethyl-1,10-phenanthroline and 1,10-phenanthroline-5-sulfonic acid. The preferred phenanthroline is 1,10-phenanthroline and this compound and 2,2'-bipyridine form a preferred class of cyclic bidentate nitrogen ligands.

The bidentate ligand is employed in a quantity from about 0.5 mol to about 200 mol per mol of palladium compound, with quantities of from about 1 mol to about 50 mol per mol of palladium compound being preferred.

Although not required, it is useful on occasion to add a catalyst promoter as an additional catalyst composition component in order to enhance catalyst activity. In general, organic oxidizing agents are useful catalyst promoters including organic peroxides, organic nitro and nitrate compounds and quinones. The quinones constitute the preferred class of catalyst promoters including benzoquinones, naphthaquinones and anthraquinones. When promoter is employed, satisfactory results are obtained with the benzoquinones, particularly 1,4-benzoquinone.

As stated, the use of a catalyst promoter is optional and amounts up to about 10,000 mol per gram atom of palladium are suitable. When promoter is present, quantities from about 10 mol to about 5000 mol per gram atom of palladium are preferred.

The polymers of the invention are linear alternating polymers of carbon monoxide and ethylenically unsaturated hydrocarbon. The polymers are terpolymers of carbon monoxide, ethylene and a sufficient amount of secondary ethylenically unsaturated hydrocarbon to realize the desired reduced melting point. Suitable secondary ethylenically unsaturated hydrocarbons have from 4 to 10 carbon atoms inclusive and are of the formula

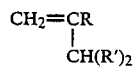

wherein R is alkyl and R' is hydrogen or R. Illustrative of such hydrocarbons are 2-methyl-1-propene (isobutylene), 2-methyl-1-butene, 2-methyl-1-pentene, 2-ethyl-1-butene, 2-ethyl-1-pentene and 2,4,4-trimethyl-1-pentene. The preferred secondary ethylenically unsaturated hydrocarbon is isobutylene.

The terpolymer therefore consists of units of

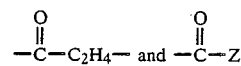

distributed randomly throughout the polymer wherein Z represents the moiety of the secondary ethylenically unsaturated hydrocarbon polymerized through the ethylenic unsaturation. In general, the

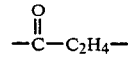

units will be present in an excess over the

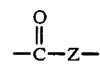

units, but a sufficiently proportion of

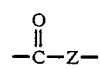

units are required if the desired lowering of melting point is to be realized. The ratio of

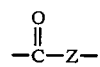

unit to

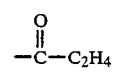

units should be at least about 0.005 but should not exceed about 0.5. In preferred modifications, this ratio is at least about 0.005 but not more than about 0.01.

Polymerization is effected by contacting the monomers and catalyst under polymerization conditions. Suitable reaction temperatures vary from about 20° C. to about 200° C., preferably from about 30° C. to about 150° C. Suitable reaction pressures are from about 1 bar to about 200 bar, preferably from about 20 bar to about 100 bar. Sufficient catalyst is employed to provide from about $1 \times 10^{-7}$ to about $1 \times 10^{-3}$ gram atoms of palladium, preferably from about $1 \times 10^{-6}$ to about $1 \times 10^{-3}$ gram atoms of palladium. The reaction is preferably conducted in the liquid phase in the presence of an inert diluent, particularly a lower alkanol such as methanol or ethanol. Contacting of reactants and catalyst is brought about by shaking, stirring or other conventional means and subsequent to reaction, the polymer product is recovered by known methods such as filtration or decantation. The product will, on occasion, contain residues of catalyst which are removed, if desired, by contacting with a solvent which is selective for the residues.

The terpolymer products are thermoplastics of known utility, enhanced by the observed reduced melting point relative to analogous copolymers. The terpolymers are, for example, compression molded or injection molded into solid plaques or billets and are thereafter shaped by drawing or other conventional methods into containers for the food and drink industry or parts for the automotive industry. They are also fabricated into cables or shaped members which find use in construction fields.

The invention is further illustrated by the following Comparative Examples (not of the invention) and Illustrative Embodiments which should not be construed to limit the invention.

COMPARATIVE EXAMPLE I

A copolymer of carbon dioxide and ethylene was prepared by charging to a stirred autoclave of 300 ml capacity a catalyst solution comprising 50 ml of methanol, 0.1 mmol of palladium acetate, 0.5 mmol of copper p-tosylate (p-toluenesulfonate), 0.15 mmol of 1,3-bis(diphenylphosphino) propane and 2 mmol of benzoquinone. The air present in the autoclave was removed by evacuation and ethylene was introduced until a pressure of 20 bar had been reached. Carbon monoxide was then introduced until a pressure of 50 bar was reached. The temperature of the contents of the autoclave was raised to 55° C. and maintained for 1 hour, after which polymerization was terminated by cooling to room temperature and releasing the pressure. The polymer product was removed by filtration, washed with methanol and dried in vacuo at room temperature. 20 Grams of copolymer having a melting point of 257° C. were obtained.

COMPARATIVE EXAMPLE II

A terpolymer of carbon monoxide, ethylene and isobutylene (2-methyl-propene-1) was prepared by a procedure similar to that of Comparative Example I with the difference being that after the autoclave was evacuated, 50 ml of isobutylene was added, the reaction temperature was 70° C. instead of 55° C. and the reaction time was 5 hours instead of 1 hour. A 10 g quantity of a terpolymer product, melting point 250° C., was obtained. From $^{13}$C-NMR analysis it was shown that the ratio of isobutylene units to ethylene units in the terpolymer was less than 0.0005.

ILLUSTRATIVE EMBODIMENT I

A terpolymer of carbon monoxide, ethylene and isobutylene was produced by charging to a stirred autoclave of 300 ml capacity a catalyst solution comprising 30 ml of methanol, 0.1 mmol of palladium acetate, 2 mmol of p-toluenesulfonic acid, 0.3 mmol of 2,2'-bipyridine and 10 mmol of 1,4-benzoquinone. After removal of the air present in the autoclave by evacuation, 50 ml of isobutylene was introduced into the autoclave followed by ethylene until a pressure of 15 bar was reached and carbon monoxide until a pressure of 45 bar was reached. The temperature of the contents of the autoclave was raised to 90° C. and maintained for 5 hours. The polymerization was then terminated by cooling to room temperature and releasing the pressure. The terpolymer product was removed by filtration, washed with methanol and dried in vacuo at room temperature. The terpolymer obtained, 14.2 g, had a melting point of 225° C.

From $^{13}$C-NMR analysis it was determined that the terpolymer consisted of units of

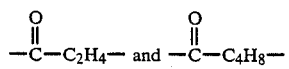

distributed randomly through the polymer and that the ratio of isobutylene units to ethylene units was 0.03.

ILLUSTRATIVE EMBODIMENT II

The procedure of Illustrative Embodiment I as repeated except that a certain temperature of 75° C. instead of 90° C. was employed. The terpolymer obtained, 13.1 g, had a melting point of 230° C.

From $^{13}$C-NMR analysis it was determined that the product contained

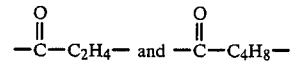

units randomly distributed through the polymer and that the ratio of isobutylene units to ethylene units was 0.022.

What is claimed is:

1. In the process of producing a linear alternating terpolymer of carbon monoxide, ethylene and a secondary ethylenically unsaturated hydrocarbon under polymerization conditions in the presence of a catalyst formed from a palladium compound, an anion of a non-hydrohalogenic acid having a pKa less than about 4 and a bidentate ligand, the improvement wherein the bidentate ligand is a bidentate ligand of the formula

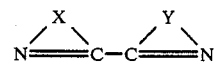

wherein X and Y independently are bridging groups of from 2 to 10 carbon atoms inclusive and up to 2 carbon atoms, which ligand is selected from 2,2'-bipyridines, 1,10-phenanthrolines, 2,2'-biquinolones, 2-(2-pyridyl)-benzimidazoles or 3-(2-pyridyl)-5,6-diphenyl-1,2,4-triazines.

2. The process of claim 1 wherein the nitrogen bidentate ligand is selected from the 2,2'-bipyridines or the 1,10-phenanthrolines.

3. The process of claim 2 wherein the bidentate nitrogen ligand is 2,2'-bipyridine.

4. The process of claim 2 wherein the bidentate nitrogen ligand is 1,10-phenanthroline.

5. In the process of producing a linear alternating terpolymer of carbon monoxide, ethylene and isobutylene under polymerization conditions is the presence of a catalyst formed from a palladium alkanoate, an anion of a non-hydrohalogenic acid selected from trifluoroacetic acid or p-toluenesulfonic acid and a bidentate ligand, the improvement wherein the bidentate ligand is a bidentate ligand of the formula

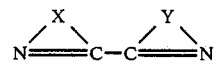

wherein X and Y independently are bridging groups of 2 to 10 carbon atoms inclusive and up to 2 nitrogen atoms, with from 3 to 4 atoms in the bridge at least two of which are carbon atoms and any other atoms in the bridge are nitrogen atoms, which ligand is selected from 2,2'-bipyridines or 1,10-phenanthrolines.

6. The process of claim 5 wherein X and Y are the same.

7. The process of claim 6 wherein the bidentate ligand is 2,2'-bipyridine or 1,10-phenanthroline.

8. The process of claim 7 wherein the bidentate ligand is 2,2'-bipyridine.

* * * * *